US011871347B2

United States Patent
Kim et al.

(10) Patent No.: US 11,871,347 B2
(45) Date of Patent: *Jan. 9, 2024

(54) CONTROL INDICATOR FOR POWER SAVING IN A MOBILE WIRELESS COMMUNICATION DEVICE

(71) Applicant: Apple Inc., Cupertino, CA (US)

(72) Inventors: Yuchul Kim, Santa Clara, CA (US); Wei Zeng, San Diego, CA (US); Dawei Zhang, Saratoga, CA (US)

(73) Assignee: Apple Inc., Cupertino, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/718,132

(22) Filed: Apr. 11, 2022

(65) Prior Publication Data

US 2022/0240185 A1 Jul. 28, 2022

Related U.S. Application Data

(63) Continuation of application No. 16/594,401, filed on Oct. 7, 2019, now Pat. No. 11,304,138, which is a
(Continued)

(51) Int. Cl.
*H04W 52/02* (2009.01)
*H04W 72/0446* (2023.01)
(Continued)

(52) U.S. Cl.
CPC ....... *H04W 52/0229* (2013.01); *H04L 5/0053* (2013.01); *H04W 4/08* (2013.01);
(Continued)

(58) Field of Classification Search
None
See application file for complete search history.

(56) References Cited

U.S. PATENT DOCUMENTS

2011/0299489 A1 * 12/2011 Kim .................. H04L 1/0061
370/329
2012/0207103 A1 8/2012 Dai
(Continued)

FOREIGN PATENT DOCUMENTS

| CN | 106375060 | 2/2017 |
|---|---|---|
| RU | 2517690 | 5/2017 |
| WO | 2016018469 | 2/2016 |

OTHER PUBLICATIONS

Ericsson; "Summary of e-mail discussions on downlink control signaling"; 3GPP DRAFT; R1-1612908; 3rd Generation Partnership Project (3GPP), Mobile Competence Centre; 650, Route Des Lucioles; F-06921, Sophia-Antipo; vol. RAN WG1, No. Reno, NV, USA; Nov. 13, 2016; XP051190931; Retrieved from the Internet: URL:http://www.3gpp.org/ftp/tsg_ran/WG1_RL1/TSGR1_87/Docs/ [retrieved on Nov. 13, 2016]; 37 pages.
(Continued)

*Primary Examiner* — Eunsook Choi
(74) *Attorney, Agent, or Firm* — Kowert, Hood, Munyon, Rankin & Goetzel, P.C.

(57) ABSTRACT

A wireless communication device (UE) may receive control indicator information (CII) indicating whether one or more candidate physical control channels (PCCs) are available to the UE for decoding. The UE may perform respective blind decoding if the CII indicates that the one or more candidate PCCs are available, to decode a respective PCC intended for the UE. The UE may receive the CII in the same slot in which PCCs are transmitted, or it may receive the CII in another slot, which may be a narrowband slot. The UE may receive the PCCs in the same slot in which corresponding physical data channels (PDCs) are transmitted, or it may receive the PCCs in another slot, e.g. a slot immediately preceding the slot in which the corresponding PDCs are transmitted. By eliminating unnecessary blind decoding and
(Continued)

receiving the CII over narrowband, power consumption of the UE may be greatly reduced.

20 Claims, 9 Drawing Sheets

Related U.S. Application Data continuation of application No. 15/892,859, filed on Feb. 9, 2018, now Pat. No. 10,477,475.

(60) Provisional application No. 62/475,683, filed on Mar. 23, 2017.

(51) Int. Cl.
*H04W 4/08* (2009.01)
*H04L 5/00* (2006.01)
*H04W 72/23* (2023.01)
*H04W 72/04* (2023.01)

(52) U.S. Cl.
CPC ... *H04W 52/0216* (2013.01); *H04W 72/0446* (2013.01); *H04W 72/23* (2023.01); *H04L 5/0007* (2013.01); *H04L 5/0091* (2013.01); *Y02D 30/70* (2020.08)

(56) References Cited

U.S. PATENT DOCUMENTS

| | | | | |
|---|---|---|---|---|
| 2012/0250551 A1* | 10/2012 | Sartori | ............... | H04W 48/12 370/252 |
| 2013/0272261 A1* | 10/2013 | Seo | ............... | H04J 11/0056 370/329 |
| 2014/0112280 A1 | 4/2014 | Lee | | |
| 2014/0161084 A1 | 6/2014 | Yang | | |
| 2014/0293942 A1* | 10/2014 | Kang | ............... | H04L 5/0037 370/329 |
| 2017/0026941 A1 | 1/2017 | Su | | |
| 2017/0085345 A1* | 3/2017 | Dinan | ............... | H04L 5/0098 |
| 2017/0094647 A1* | 3/2017 | Ko | ............... | H04W 72/044 |
| 2017/0223725 A1* | 8/2017 | Xiong | ............... | H04W 72/23 |
| 2017/0332359 A1* | 11/2017 | Tsai | ............... | H04W 72/046 |
| 2018/0124744 A1* | 5/2018 | Xue | ............... | H04L 5/0094 |
| 2018/0234969 A1* | 8/2018 | Wang | ............... | H04L 5/0053 |
| 2019/0349915 A1* | 11/2019 | Ahn | ............... | H04W 72/046 |

OTHER PUBLICATIONS

Apple Inc; "Control indicator channel for UE power saving": 3GPP DRAFT; RI-1708283; 3rd Generation Partnership Project (3GPP), Mobile Competence Centre; 650, Route Des Lucioles ; F-06921 Sophia-Antipolis Cedex; vol. RAN WGI, No. Hangzhou, China; May 7, 2017; XP051263174; Retrieved from the Internet: URL:http://www.3gpp.org/ftp/tsg ran/WGI RL1/TSGRI 89/Docs/ [retrieved on May 7, 2017]; 3 pages.
International Search Report and Written Opinion, Application No. PCT/US2018/020295, dated May 30, 2018, 15 pages.
First Examination Report for Application No. IN 201917030384, dated Feb. 5, 2021, 6 pages.
First Office Action for CN Patent Application No. 20188014900.8, dated Aug. 31, 2021, 11 pages.
Apple Inc. "Control Indicator Channel for UE Power Saving"; 3GPP TSG-RAN WG1 #88bis R1-1705050, Spokane, USA, Mar. 3-7, 2017; 4 pages.

* cited by examiner

CONTROL INDICATOR FOR POWER SAVING IN A MOBILE WIRELESS COMMUNICATION DEVICE

PRIORITY CLAIM

This application is a continuation of U.S. patent application Ser. No. 16/594,401 titled "Control Indicator for Power Saving in a Mobile Wireless Communication Device", filed on Oct. 7, 2019 which is a continuation of U.S. patent application Ser. No. 15/892,859 titled "Control Indicator for Power Saving in a Mobile Wireless Communication Device", filed on Feb. 9, 2018, now U.S. Pat. No. 10,477,475 issued on Nov. 12, 2019, which claims benefit of priority of U.S. Provisional Patent Application Ser. No. 62/475,683 titled "Control Indicator for Power Saving in a Mobile Wireless Communication Device", filed on Mar. 23, 2017, which are hereby incorporated by reference in its entirety as though fully and completely set forth herein.

The claims in the instant application are different than those of the parent application or other related applications. The Applicant therefore rescinds any disclaimer of claim scope made in the parent application or any predecessor application in relation to the instant application. The Examiner is therefore advised that any such previous disclaimer and the cited references that it was made to avoid, may need to be revisited. Further, any disclaimer made in the instant application should not be read into or against the parent application or other related applications.

FIELD OF THE INVENTION

The present application relates to wireless communications and wireless communication devices, and more particularly to the use of control indicators for power saving in wireless communication devices, e.g. during 5G New Radio (5G-NR) communications.

DESCRIPTION OF THE RELATED ART

Wireless communication systems are rapidly growing in usage. In recent years, wireless devices such as smart phones and tablet computers have become increasingly sophisticated. In addition to supporting telephone calls, many mobile devices now provide access to the internet, email, text messaging, and navigation using the global positioning system (GPS), and are capable of operating sophisticated applications that utilize these functionalities.

Long Term Evolution (LTE) has become the technology of choice for the majority of wireless network operators worldwide, providing mobile broadband data and high-speed Internet access to their subscriber base. LTE defines a number of downlink (DL) physical channels, categorized as transport or control channels, to carry information blocks received from the MAC and higher layers. LTE also defines three physical layer channels for the uplink (UL).

The Physical Downlink Shared Channel (PDSCH) is a DL transport channel, and is the main data-bearing channel allocated to users on a dynamic and opportunistic basis. The PDSCH carries data in Transport Blocks (TB) corresponding to a media access control protocol data unit (MAC PDU), passed from the MAC layer to the physical (PHY) layer once per Transmission Time Interval (TTI). The PDSCH is also used to transmit broadcast information such as System Information Blocks (SIB) and paging messages.

The Physical Downlink Control Channel (PDCCH) is a DL control channel that carries the resource assignment for UEs that are contained in a Downlink Control Information (DCI) message. Multiple PDCCHs can be transmitted in the same subframe using Control Channel Elements (CCE), each of which is a nine set of four resource elements known as Resource Element Groups (REG). The PDCCH employs quadrature phase-shift keying (QPSK) modulation, with four QPSK symbols mapped to each REG. Furthermore, 1, 2, 4, or 8 CCEs can be used for a UE, depending on channel conditions, to ensure sufficient robustness.

The Physical Uplink Shared Channel (PUSCH) is a UL channel shared by all devices (user equipment, UE) in a radio cell to transmit user data to the network. The scheduling for all UEs is under control of the LTE base station (enhanced Node B, or eNB). The eNB uses the uplink scheduling grant (DCI format 0) to inform the UE about resource block (RB) assignment, and the modulation and coding scheme to be used. PUSCH typically supports QPSK and quadrature amplitude modulation (QAM). In addition to user data, the PUSCH also carries any control information necessary to decode the information, such as transport format indicators and multiple-in multiple-out (MIMO) parameters. Control data is multiplexed with information data prior to digital Fourier transform (DFT) spreading.

The Physical Control Format Indicator Channel (PC-FICH) is a DL control channel that carries the Control format Indicator (CFI) which includes the number of orthogonal frequency-division multiplexing (OFDM) symbols used for control channel transmission in each subframe (typically 1, 2, or 3). The 32-bit long CFI is mapped to 16 Resource Elements in the first OFDM symbol of each downlink frame using QPSK modulation.

Therefore, as indicated above, during data communication over LTE, the DL uses the physical channel PDSCH, while the UL uses the UL channel PUSCH. As also mentioned above, these two channels convey the transport blocks of data in addition to some MAC control and system information. To support the transmission of DL and UL transport channels, Downlink Shared Channel (DLSCH) and Uplink Shared Channel (UL-SCH) control signaling is needed. This control information is sent in PDCCH and it contains DL resource assignment and UL grant information. PDCCH is sent in the beginning of every subframe in the first OFDM symbols. Depending on the level of robustness and the PDCCH system capacity (numbers of users to be simultaneously served in a TTI) the NW needs to achieve, PDCCH will be transmitted in either the first 1, 2, 3, or 4 OFDM symbols of a subframe. The number of OFDM symbols used in PDCCH is signaled in PCFICH. In order to improve operation of range constrained devices and/or devices operating in weak coverage areas, blind decoding of the PDCCH was developed as a possible mechanism for alleviating the negative effects of bad reception of the PCFICH.

A proposed next telecommunications standard moving beyond the current International Mobile Telecommunications-Advanced (IMT-Advanced) Standards is called 5th generation mobile networks or 5th generation wireless systems, or 5G for short (otherwise known as 5G-NR for 5G New Radio, also simply referred to as NR). 5G-NR proposes a higher capacity for a higher density of mobile broadband users, also supporting device-to-device, ultra-reliable, and massive machine communications, as well as lower latency and lower battery consumption, than current LTE standards. Consequently, efforts are being made in ongoing developments of 5G-NR to reduce a mobile device's blind decoding attempts, in order to achieve additional power savings.

SUMMARY OF THE INVENTION

Embodiments described herein relate to a User Equipment (UE) device, base station, and/or relay station, and associated method for providing a control indicator to wireless communication devices for power saving during wireless communications, e.g. during 5G-NR (NR) wireless communications and transmissions.

In some embodiments, an indication may be transmitted to UEs (e.g. by a base station or gNB), signaling the presence of PDCCH for UEs, making it possible for non-scheduled UEs to avoid performing unnecessary blind decoding. The indication may be transmitted on a per-UE or per-group basis, depending on the design. If the indication is transmitted per-UE, then each UE in a cell may receive one indication signaling the presence of a PDCCH for the UE. All the non-scheduled UEs which correctly decode the indication information may avoid unnecessary blind decoding. If the indication is transmitted per-group (with a group size of at least two UEs), then UEs in the group may all perform blind decoding when they receive an indication signaling the presence of a PDCCH for the group. In case of a per-group indication, there may be UEs which do not receive a PDCCH but still receive the indication. If the indication signals no PDCCH for the group, then UEs in the group may stop decoding and enter a sleep state for the remaining duration of the slot. The group size and the number of groups may be configurable.

Pursuant to the above, in some embodiments, UEs may be organized into groups (e.g. by gNB) for the purpose of indicating the presence or availability of a PDCCH for each group. The gNB may indicate the presence or availability of a PDCCH to a group of UEs in case there is a PDCCH scheduled for any of the UEs in the group. The size of the group and the number of groups may be configurable.

There may be multiple options for a physical channel structure carrying the control indicator information. For example, existing PDCCH structure(s) may be reused. Control indicator information may be transmitted by existing PDCCHs in common control search space monitored by all UEs. Another option may be the use of existing group-common PDCCHs. The control indicator information may be carried in group-common PDCCHs for carrying common information for group of UEs. Since group-common PDCCHs are transmitted in the first OFDM symbol (e.g. in the first slot), it may be effective for preventing the UE from performing further processing. Yet another option includes designating a new physical channel for the purpose of transmitting the control indicator information.

Transmission of the control indicator information may be performed according to a number of different scenarios based on the timing of the control indicator information and the NR-PDCCH with respect to each other, and the timing of the NR-PDCCH and the NR-PDSCH with respect to each other. In some embodiments, the control indicator information and the NR-PDCCH may be transmitted in the same slot, while the NR-PDCCH and the NR-PDSCH are transmitted according to same-slot scheduling. In some other embodiments, the control indicator information and the NR-PDCCH may be transmitted in the same slot, while the NR-PDCCH and the NR-PDSCH are transmitted according to cross-slot scheduling. In yet other embodiments, the control indicator information and the NR-PDCCH may be transmitted in different slots, while the NR-PDCCH and the NR-PDSCH are transmitted according to same-slot scheduling. Finally, the control indicator information and the NR-PDCCH may be transmitted in different slots, while the NR-PDCCH and the NR-PDSCH are transmitted according to cross-slot scheduling.

Pursuant to the above, a wireless communication device (UE) may achieve considerable power savings during wireless communications. The UE may receive, as part of the wireless communications, control indicator information indicating whether one or more candidate physical control channels are available to the UE for decoding. If the control indicator information received by the UE indicates candidate physical channels are available, the UE may perform blind decoding of the candidate physical control channels to detect a respective physical control channel (of the candidate physical control channels) intended for the UE. If the control indicator information received by the UE indicates that no candidate physical control channels are available for decoding, the UE does not perform the blind decoding, and may enter a sleep state until the next slot in which the UE may again be scheduled.

The UE may receive the control indicator information in a slot other than a corresponding slot in which the physical control channels are transmitted. In that case, the slot in which the control indicator information is received may be a narrowband slot to achieve further power savings. Alternately, the UE may receive the control indicator information in the same slot in which the physical control channels are transmitted. In general, the UE may receive the control indicator information over a channel that also includes other information, or it may receive the control indicator information over a channel dedicated to carrying the control indicator information. The dedicated channel carrying the control indicator information may be a narrowband channel, which allows for additional power savings for the UE.

Upon detecting a respective physical control channel intended for the UE, the UE may decode a respective physical data channel corresponding to the detected decoded respective physical control channel. In that case, the UE may receive the respective physical control channel in a slot other than a corresponding slot in which corresponding physical data channels are transmitted, or it may receive the respective physical control channel in the same slot in which the corresponding physical data channels are transmitted. The UE may be part of a specified group of devices, with the control indicator information received by the UE applying to all the devices in the specified group.

This Summary is intended to provide a brief overview of some of the subject matter described in this document. Accordingly, it will be appreciated that the above-described features are merely examples and should not be construed to narrow the scope or spirit of the subject matter described herein in any way. Other features, aspects, and advantages of the subject matter described herein will become apparent from the following Detailed Description, Figures, and Claims.

Figure 1:
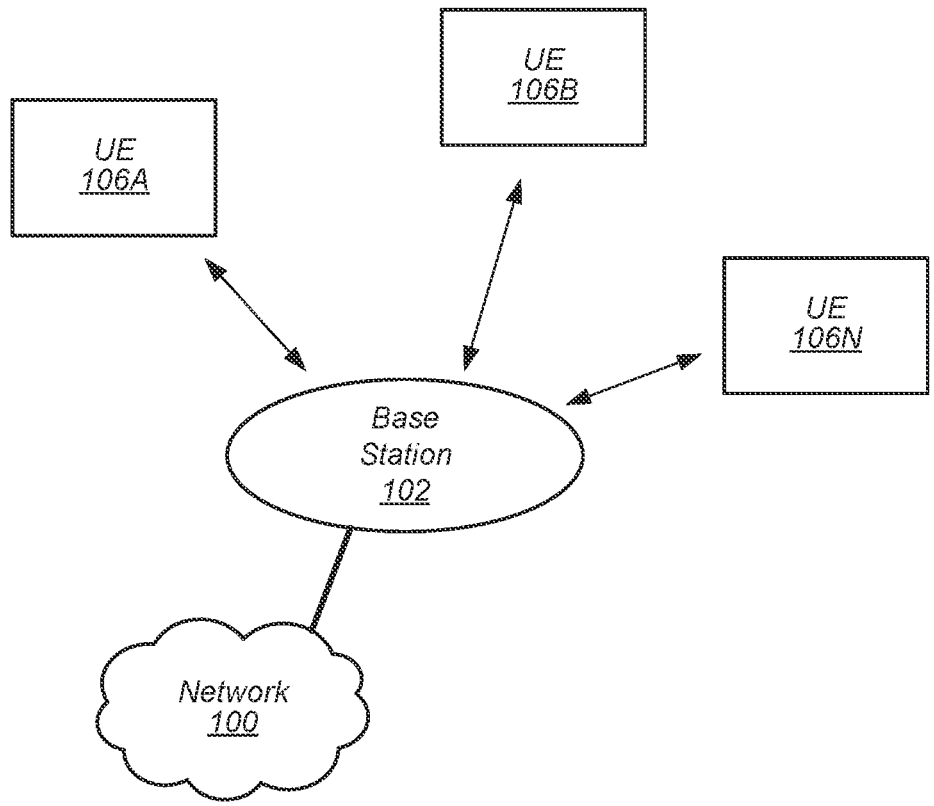
FIG. 1 illustrates an exemplary (and simplified) wireless communication system according to some embodiments.

While features described herein are susceptible to various modifications and alternative forms, specific embodiments thereof are shown by way of example in the drawings and are herein described in detail. It should be understood, however, that the drawings and detailed description thereto are not intended to be limiting to the particular form disclosed, but on the contrary, the intention is to cover all modifications, equivalents and alternatives falling within the spirit and scope of the subject matter as defined by the appended claims.

DETAILED DESCRIPTION OF THE EMBODIMENTS

Acronyms

Various acronyms are used throughout the present application. Definitions of the most prominently used acronyms that may appear throughout the present application are provided below:

ACK: Acknowledge
ARQ: Automatic Repeat Request (also: Automatic Repeat Query)
BPSK: Binary Phase-Shift Keying
BS: Base Station
CCE: Control Channel Elements
CFI: Control format Indicator
CQI: Channel Quality Indicator
CRC: Cyclic Redundancy Check
DCI: Downlink Control Information
DL: Downlink (from BS to UE)
DL-SCH: Downlink Shared Channel
FDD: Frequency Division Duplexing
FEC: Forward Error Correction
GPS: Global Positioning System
GSM: Global System for Mobile Communication
HARQ: Hybrid Automatic Repeat Request
LTE: Long Term Evolution
MAC: Media Access Control (layer)
MIMO: Multiple-In Multiple-Out
NACK: Negative Acknowledge
NW: Network
OFDM: Orthogonal Frequency-Division Multiplexing
PCFICH: Physical Control Format Indicator Channel
PDCCH: Physical Downlink Control Channel
PDSCH: Physical Downlink Shared Channel
PDU: Protocol Data Unit
PHICH: Physical HARQ Indicator Channel
PUSCH: Physical Uplink Shared Channel
PHY: Physical (Layer)
QPSK: Quadrature Phase-Shift Keying
REG: Resource Element Group
RNTI: Radio Network Temporary Identifiers
RRC: Radio Resource Control
RSRP: Reference Signal Received Power
RSSI: Reference Signal Strength Indicator
RX: Reception
SINR: Signal-To-Interference-Plus-Noise Ratio
TB: Transport Blocks
TDD: Time Division Duplexing
TTI: Transmission Time Interval
TX: Transmission
UE: User Equipment
UL: Uplink (from UE to BS)
ULSCH: Uplink Shared Channel
UMTS: Universal Mobile Telecommunication System Terms The following is a glossary of terms that may appear in the present application:

Memory Medium—Any of various types of memory devices or storage devices. The term "memory medium" is intended to include an installation medium, e.g., a CD-ROM, floppy disks, or tape device; a computer system memory or random access memory such as DRAM, DDR RAM, SRAM, EDO RAM, Rambus RAM, etc.; a non-transitory memory such as a Flash, magnetic media, e.g., a hard drive, or optical storage; registers, or other similar types of memory elements, etc. The memory medium may comprise other types of memory as well or combinations thereof. In addition, the memory medium may be located in a first computer system in which the programs are executed, or may be located in a second different computer system which connects to the first computer system over a network, such as the Internet. In the latter instance, the second computer system may provide program instructions to the first computer system for execution. The term "memory medium" may include two or more memory mediums which may reside in different locations, e.g., in different computer systems that are connected over a network.

Carrier Medium—a memory medium as described above, as well as a physical transmission medium, such as a bus, network, and/or other physical transmission medium that conveys signals such as electrical, electromagnetic, or digital signals.

Computer System (or Computer)—any of various types of computing or processing systems, including a personal computer system (PC), mainframe computer system, workstation, network appliance, Internet appliance, personal digital assistant (PDA), television system, grid computing system, or other device or combinations of devices. In general, the term "computer system" can be broadly defined to encompass any device (or combination of devices) having at least one processor that executes instructions from a memory medium.

User Equipment (UE) (or "UE Device")—any of various types of computer systems devices which are mobile or portable and which performs wireless communications. Examples of UE devices include mobile telephones or smart phones (e.g., iPhone™, Android™-based phones), portable gaming devices (e.g., Nintendo DS™, Play Station Portable™, Gameboy Advance™, iPhone™), laptops, wearable devices (e.g. smart watch, smart glasses), PDAs, portable Internet devices, music players, data storage devices, or other handheld devices, etc. In general, the term "UE" or "UE device" can be broadly defined to encompass any electronic, computing, and/or telecommunications device (or combination of devices) which is easily transported by a user and capable of wireless communication.

Base Station (BS)—The term "Base Station" has the full breadth of its ordinary meaning, and at least includes a wireless communication station installed at a fixed location and used to communicate as part of a wireless telephone system or radio system.

Processing Element—refers to various elements or combinations of elements that are capable of performing a function in a device, e.g. in a user equipment device or in a cellular network device. Processing elements may include, for example: processors and associated memory, portions or circuits of individual processor cores, entire processor cores, processor arrays, circuits such as ASICs (Application Specific Integrated Circuits), programmable hardware elements such as a field programmable gate array (FPGA), as well any of various combinations of the above.

Automatically—refers to an action or operation performed by a computer system (e.g., software executed by the computer system) or device (e.g., circuitry, programmable hardware elements, ASICs, etc.), without user input directly specifying or performing the action or operation. Thus the term "automatically" is in contrast to an operation being manually performed or specified by the user, where the user provides input to directly perform the operation. An automatic procedure may be initiated by input provided by the user, but the subsequent actions that are performed "automatically" are not specified by the user, i.e., are not performed "manually", where the user specifies each action to perform. For example, a user filling out an electronic form by selecting each field and providing input specifying information (e.g., by typing information, selecting check boxes, radio selections, etc.) is filling out the form manually, even though the computer system must update the form in response to the user actions. The form may be automatically filled out by the computer system where the computer system (e.g., software executing on the computer system) analyzes the fields of the form and fills in the form without any user input specifying the answers to the fields. As indicated above, the user may invoke the automatic filling of the form, but is not involved in the actual filling of the form (e.g., the user is not manually specifying answers to fields but rather they are being automatically completed). The present specification provides various examples of operations being automatically performed in response to actions the user has taken.

DCI—refers to downlink control information. There are various DCI formats used in LTE in PDCCH (Physical Downlink Control Channel). The DCI format is a predefined format in which the downlink control information is packed/formed and transmitted in PDCCH.

Figure 2:
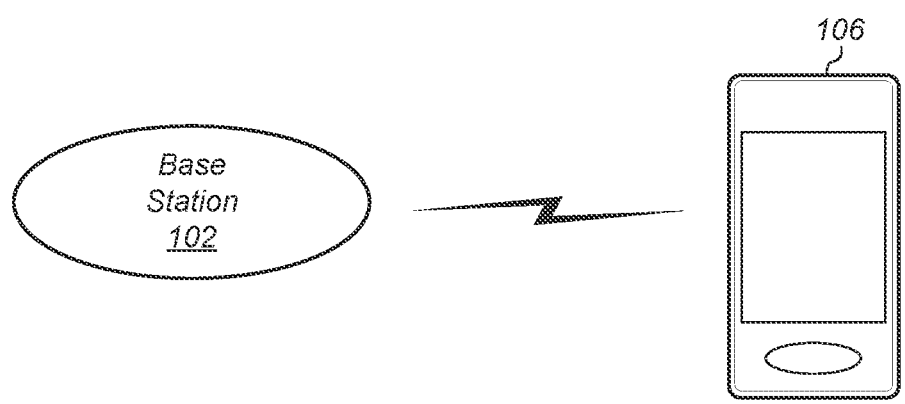
FIG. 2 illustrates a base station in communication with a wireless user equipment (UE) device according to some embodiments.

FIGS. 1 and 2—Communication System

FIG. 1 illustrates an exemplary (and simplified) wireless communication system. It is noted that the system of FIG. 1 is merely one example of a possible system, and embodiments may be implemented in any of various systems, as desired. As shown, the exemplary wireless communication system includes a base station 102 which communicates over a transmission medium with one or more user devices 106A through 106N. Each of the user devices may be referred to herein as a "user equipment" (UE) or UE device. Thus, the user devices 106A-106N are referred to as UEs or UE devices. Furthermore, when referring to an individual UE in general, user devices are also referenced herein as UE 106 or simply UE.

The base station 102 may be a base transceiver station (BTS) or cell site, and may include hardware that enables wireless communication with the UEs 106A through 106N. The base station 102 may also be equipped to communicate with a network 100 (e.g., a core network of a cellular service provider, a telecommunication network such as a public switched telephone network (PSTN), and/or the Internet, among various possibilities). Thus, the base station 102 may facilitate communication between the user devices and/or between the user devices and the network 100. The communication area (or coverage area) of the base station may be referred to as a "cell." As also used herein, from the perspective of UEs, a base station may sometimes be considered as representing the network insofar as uplink and downlink communications of the UE are concerned. Thus, a UE communicating with one or more base stations in the network may also be interpreted as the UE communicating with the network. It should also be noted that "cell" may also refer to a logical identity for a given coverage area at a given frequency. In general, any independent cellular wireless coverage area may be referred to as a "cell". In such cases a base station may be situated at particular confluences of three cells. The base station, in this uniform topology may serve three 120-degree beam-width areas referenced as cells. Also, in case of carrier aggregation, small cells, relays, etc. may each represent a cell. Thus, in carrier aggregation in particular, there may be primary cells and secondary cells which may service at least partially overlapping coverage areas but on different respective frequencies. For example, a base station may serve any number of cells, and cells served by a base station may or may not be collocated (e.g. remote radio heads).

The base station 102 and the user devices may be configured to communicate over the transmission medium using any of various radio access technologies (RATs), also referred to as wireless communication technologies, or telecommunication standards, such as GSM, UMTS (WCDMA), LTE, LTE-Advanced (LTE-A), 3GPP2 CDMA2000 (e.g., 1×RTT, 1×EV-DO, HRPD, eHRPD), Wi-Fi, WiMAX etc. In some embodiments, the base station 102 communicates with at least one UE or a group of UEs using control indicators for (or associated with) physical control channels as disclosed herein.

UE 106 may be capable of communicating using multiple wireless communication standards. For example, a UE 106 might be configured to communicate using either or both of a 3GPP cellular communication standard (such as LTE) or a 3GPP2 cellular communication standard (such as a cellular communication standard in the CDMA2000 family of cellular communication standards), or a more recent communication standard such as 5G-NR (NR). In some embodiments, the UE 106 may be configured to communicate with base station 102 using control indicators for (or corresponding to/associated with) physical control channels as described herein. Base station 102 and other similar base stations operating according to the same or a different cellular communication standard may thus be provided as one or more networks of cells, which may provide continuous or nearly continuous overlapping service to UE 106 and similar devices over a wide geographic area via one or more cellular communication standards.

The UE 106 might also or alternatively be configured to communicate using WLAN, Bluetooth, one or more global navigational satellite systems (GNSS, e.g., GPS or GLONASS), one and/or more mobile television broadcasting standards (e.g., ATSC-M/H or DVB-H), etc. Other combinations of wireless communication standards (including more than two wireless communication standards) are also possible.

FIG. 2 illustrates an exemplary system in which user equipment 106 (e.g., one of the devices 106A through 106N) is in communication with the base station 102. The UE 106 may be a device with wireless network connectivity such as a mobile phone, a hand-held device, a wearable device, a computer or a tablet, or virtually any type of wireless device. The UE 106 may include a processor that is configured to execute program instructions stored in memory. The UE 106 may perform any of the method embodiments described herein by executing such stored instructions. Alternatively, or in addition, the UE 106 may include a programmable hardware element such as an FPGA (field-programmable gate array) that is configured to perform any of the method embodiments of providing control indicators for (or corresponding to/associated with) physical control channels as described herein, or any portion of any of the method embodiments of providing control indicators for (or corresponding to/associated with) physical control channels described herein. The UE 106 may be configured to communicate using any of multiple wireless communication protocols. For example, the UE 106 may be configured to communicate using two or more of CDMA2000, LTE, LTE-A, WLAN, 5G-NR (NR) or GNSS. Other combinations of wireless communication standards are also possible.

The UE 106 may include one or more antennas for communicating using one or more wireless communication protocols. In some embodiments, the UE 106 may share one or more parts of a receive chain and/or transmit chain between multiple wireless communication standards. The shared radio may include a single antenna, or may include multiple antennas (e.g., for MIMO) for performing wireless communications. Alternatively, the UE 106 may include separate transmit and/or receive chains (e.g., including separate antennas and other radio components) for each wireless communication protocol with which it is configured to communicate. As another alternative, the UE 106 may include one or more radios which are shared between multiple wireless communication protocols, and one or more radios which are used exclusively by a single wireless communication protocol. For example, the UE 106 may include radio circuitries for communicating using either LTE or CDMA2000 1×RTT or 5G-NR (NR), and/or communicating using each of Wi-Fi and BLUETOOTH™. Other configurations are also possible.

Figure 3:
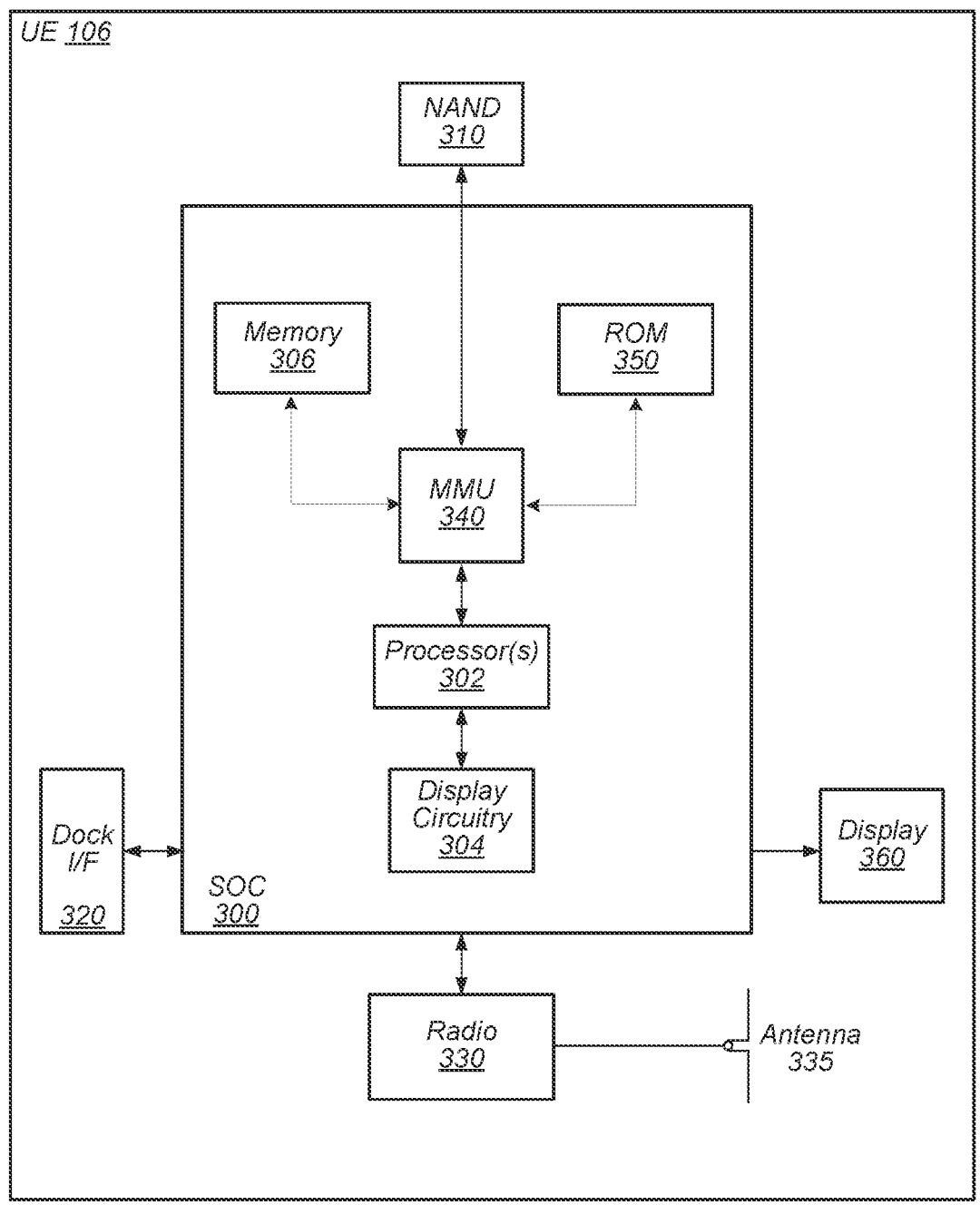
FIG. 3 illustrates an exemplary block diagram of a UE, according to some embodiments.

FIG. 3—Exemplary Block Diagram of a UE

FIG. 3 illustrates an exemplary block diagram of a UE 106. As shown, the UE 106 may include a system on chip (SOC) 300, which may include portions for various purposes. For example, as shown, the SOC 300 may include processor(s) 302 which may execute program instructions for the UE 106 and display circuitry 304 which may perform graphics processing and provide display signals to the display 360. The processor(s) 302 may also be coupled to memory management unit (MMU) 340, which may be configured to receive addresses from the processor(s) 302 and translate those addresses to locations in memory (e.g., memory 306, read only memory (ROM) 350, NAND flash memory 310) and/or to other circuits or devices, such as the display circuitry 304, radio 330, connector I/F 320, and/or display 360. The MMU 340 may be configured to perform memory protection and page table translation or set up. In some embodiments, the MMU 340 may be included as a portion of the processor(s) 302.

As shown, the SOC 300 may be coupled to various other circuits of the UE 106. For example, the UE 106 may include various types of memory (e.g., including NAND flash 310), a connector interface 320 (e.g., for coupling to the computer system), the display 360, and wireless communication circuitry 330 (e.g., for LTE, LTE-A, 5G-NR (NR), CDMA2000, BLUETOOTH™, Wi-Fi, GPS, etc.). The UE device 106 may include at least one antenna 335, and possibly multiple antennas 335, for performing wireless communication with base stations and/or other devices. For example, the UE device 106 may use antenna(s) 335 to perform the wireless communication. As noted above, the UE may be configured to communicate wirelessly using multiple wireless communication standards in some embodiments.

As described further subsequently herein, the UE 106 and base station 102 may both include hardware and software components for implementing a method for providing control indicators for (or corresponding to, or associated with) physical control channels for wireless communications, e.g. 5G-NR (NR) communications. For example, the processor 302 of the UE device 106 may be configured to implement part or all of the methods of providing control indicators for (or corresponding to, or associated with) physical control channels for wireless communications described herein, e.g., by executing program instructions stored on a memory medium (e.g., a non-transitory computer-readable memory medium). In other embodiments, processor 302 may be configured as a programmable hardware element, such as an FPGA (Field Programmable Gate Array), or as an ASIC (Application Specific Integrated Circuit). Furthermore, processor 302 may be coupled to and/or may interoperate with other components, such as Radio 330, as shown in FIG. 3, to implement provisioning control indicators for (or corresponding to, or associated with) physical control channels, according to various embodiments disclosed herein.

Figure 4:
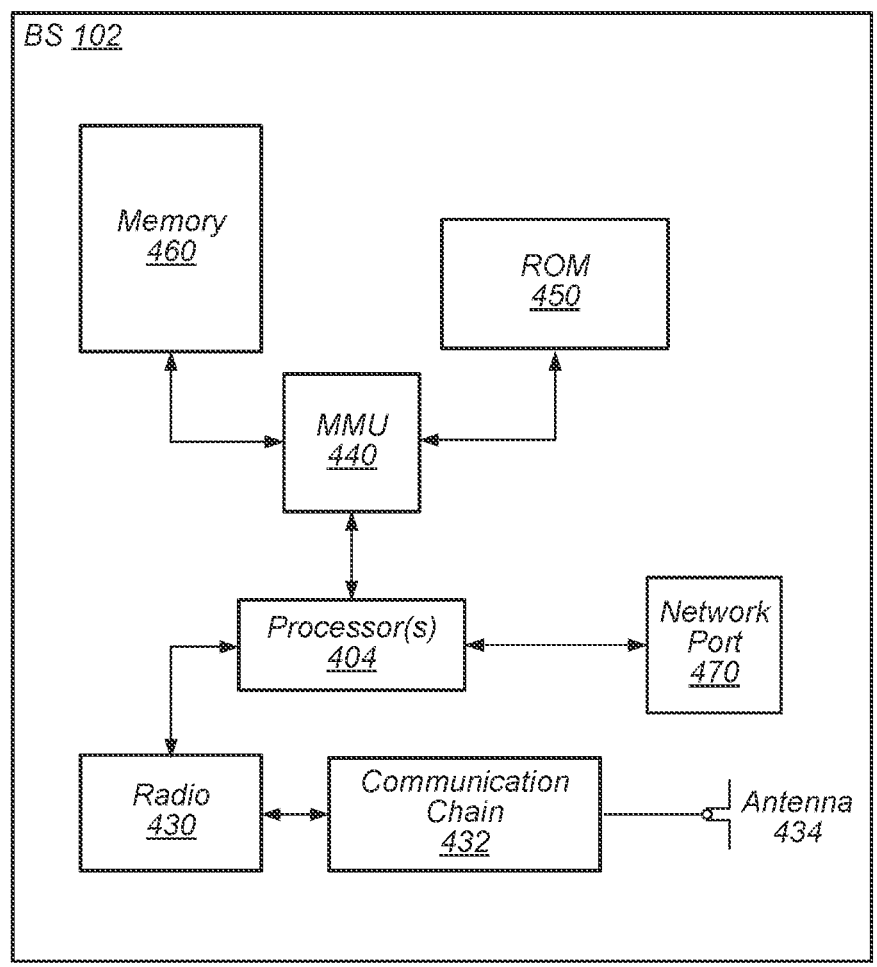
FIG. 4 illustrates an exemplary block diagram of a base station, according to some embodiments.

FIG. 4—Exemplary Block Diagram of a Base Station

FIG. 4 illustrates an exemplary block diagram of a base station 102. It is noted that the base station of FIG. 4 is merely one example of a possible base station. As shown, the base station 102 may include processor(s) 404 which may execute program instructions for the base station 102. The processor(s) 404 may also be coupled to memory management unit (MMU) 440, which may be configured to receive addresses from the processor(s) 404 and translate those addresses to locations in memory (e.g., memory 460 and read only memory (ROM) 450) or to other circuits or devices.

The base station 102 may include at least one network port 470. The network port 470 may be configured to couple to a telephone network and provide a plurality of devices, such as UE devices 106, access to the telephone network as described above in FIGS. 1 and 2. The network port 470 (or an additional network port) may also or alternatively be configured to couple to a cellular network, e.g., a core network of a cellular service provider. The core network may provide mobility related services and/or other services to a plurality of devices, such as UE devices 106. In some cases, the network port 470 may couple to a telephone network via the core network, and/or the core network may provide a telephone network (e.g., among other UE devices serviced by the cellular service provider). The core network may provide mobility related services and/or other services to a plurality of devices, such as UE devices 106. In some cases, the network port 470 may couple to a telephone network via the core network, and/or the core network may provide a telephone network (e.g., among other UE devices serviced by the cellular service provider).

The base station 102 may include at least one antenna 434, and possibly multiple antennas 434. The antenna(s) 434 may be configured to operate as a wireless transceiver and may be further configured to communicate with UE devices 106 via radio 430. The antenna 434 communicates with the radio 430 via communication chain 432. Communication chain 432 may be a receive chain, a transmit chain or both (e.g. a transceiver). The radio 430 may be configured to communicate via various wireless telecommunication standards, including, but not limited to, LTE, LTE-A WCDMA, CDMA2000, 5G-NR (NR), etc. Thus, base station 102 may be an eNB, gNB, etc. The processor(s) 404 of the base station 102 may be configured to implement part or all of the methods described herein for providing control indicators for (or corresponding to, or associated with) physical control channels, e.g., by executing program instructions stored on a memory medium (e.g., a non-transitory computer-readable memory medium). Alternatively, the processor(s) 404 may be configured as a programmable hardware element, such as an FPGA (Field Programmable Gate Array), or as an ASIC (Application Specific Integrated Circuit), or a combination thereof. Overall, the various components (460, 450, 440, 404, 430, 432, 470 and 434) of BS 102 may interoperate to implement at least part or all of the methods described herein for providing control indicators for (or corresponding to/associated with) physical control channels.

Blind Decoding in Wireless Communications (e.g. in NR Communications)

As previously mentioned, in a proposed transition to NR communications, efforts are being made to reduce blind decoding attempts of a wireless communication device (UE) for conserving/saving power of the UE. A typical UE using applications for text messaging, video streaming, and web-browsing, just to name a few applications, consumes a significant amount of time and power for decoding PDCCH without actually receiving data. The amount of time/power used for data reception is relatively small compared to the time used for PDCCH decoding only. For example, a significant portion of battery power is used for decoding PDCCH without subsequently decoding PDSCH. Consequently, the large number of blind decoding attempts a UE may make is one contributing factor of high power consumption by the UE.

The impact of downlink (DL) reception energy consumption may be considered in the context of total power consumption of a UE. For example, power consumption of a UE may be considered in the following contexts:
  decode power consumption in the physical layer for DL-control blind decoding, not yielding a grant;
  decode power consumption in the slot with the data;
  decode power consumption during the data reception process;
  decode power consumption during the measurement;
  decode power consumption in the search space (SS).

Efforts are also being made to reduce blind decoding attempts in group-common PDCCH designs. The fact that a group-common PDCCH can carry information that is common to multiple UEs may be used for the reduction of potential blind decoding attempts for UEs.

The PDCCH may be transmitted in the common search space and/or in UE-specific search space. Common control information for all UEs is transmitted through PDCCH in common search space. UE-specific control information is transmitted through PDCCH in UE-specific search space. When a UE is in connected mode (e.g. with/without Connected-Mode Discontinuous Reception, or C-DRX, communications), the UE is expected to monitor the PDCCH every slot to check whether a corresponding PDSCH exists. That is, the UE may monitor the PDCCH every slot to determine if there is a corresponding PDSCH (e.g. a PDSCH corresponding to or associated with the UE) for the UE to decode. Monitoring the PDCCH requires the UE to perform blind decoding both in common space and the UE-specific search space (with the UE-specific search space corresponding to or associated with the UE performing the decoding). The UE may perform a specified number (e.g. a designated maximum number) of blind decoding attempts, which may result in the UE consuming a significant amount of power (all the while not receiving any data), if there is actually no PDCCH scheduled for the UE.

Accordingly, various methods are disclosed herein to reduce the probability of the UE performing blind decoding of the PDCCH (or simply reduce the instances of the UE performing blind decoding of the PDCCH) in cases where there are no PDCCH/PDSCH scheduled for the UE. This may reduce power consumption and increase the battery life of the battery (or batteries) powering the UE.

Slot Scheduling

Various embodiments disclosed herein may take advantage of different slot scheduling mechanisms to reduce unnecessary blind decoding by the UE. In cellular radio communications, signal and data transmissions may be organized according to designated time units of specific duration during which individual transmissions take place. For example, in LTE, transmissions are divided into radio frames, each radio frame being of equal (time) duration (e.g. each radio frame may be 10 ms). Each radio frame in LTE may be further divided into ten subframes, each subframe being of equal duration, with the subframes designated as the smallest (minimum) scheduling unit, or the designated time unit for a transmission. Similarly, a smallest (or minimum) scheduling unit, or designated time unit for 5G-NR (NR) transmissions is referred to as a "slot". Accordingly, as used herein, the term "slot" is used to reference a smallest (or minimum) scheduling time unit or a designated time unit for transmission for the wireless communications being described. However, as noted above, in different communication protocols such a scheduling time unit may be named differently, (e.g. a "subframe" in LTE), and furthermore such a scheduling time unit may be more generally referred to as a transmission time interval (TTI).

Figure 5:
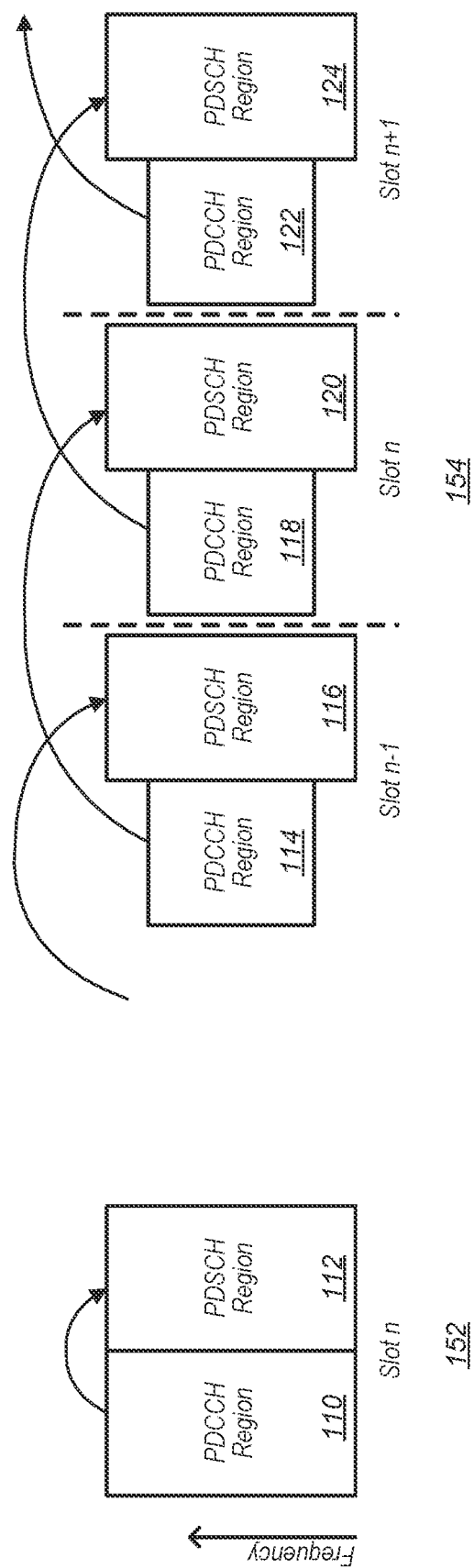
FIG. 5 shows a block diagram illustrating same-slot scheduling and cross-slot scheduling, according to some embodiments.

FIG. 5 shows a block diagram illustrating same-slot scheduling 152 and cross-slot scheduling 154 for PDCCH and PDSCH transmissions, according to some embodiments. In the case of same-slot scheduling 152, PDCCH 110 and corresponding or associated PDSCH 112 are transmitted in the same slot (or during the same slot). In the case of cross-slot scheduling 154, each PDCCH (114, 118, and 122) is transmitted ahead of its corresponding or associated PDSCH (120, 124, and not shown, respectively). As seen in FIG. 5, PDSCH 116 is associated with a PDCCH sent in a previous slot, namely slot n−2. Accordingly, PDCCH 114 is transmitted in slot n−1 while its associated PDSCH 120 is transmitted in slot n, and similarly, PDCCH 118 is transmitted in slot n while its associated PDSCH 124 is transmitted in slot n+1. The PDSCH corresponding to PDCCH 122 and the PDCCH corresponding to PDSCH 116 are not shown.

With cross-slot scheduling 154, the UE may reduce its PDCCH monitoring bandwidth (BW), which may potentially save UE power due to reduced sampling rate and processing overhead. When receiving PDSCH, the UE may receive the data at a specified (e.g. maximum) radio frequency (RF) bandwidth for high data rate transmit/receive (TX/RX). The PDCCH is typically transmitted in narrow bandwidth or narrowband (NB), while the PDSCH is transmitted in wide bandwidth or wideband (WB) which supports the higher data rates. By reducing the bandwidth (BW) for monitoring the PDCCH, the UE may save power. Cross-slot scheduling allows the UE to monitor for PDCCH in NB since the PDSCH, should an associated PDSCH exist, is transmitted in the next slot. If there is no associated PDSCH for a given decoded PDCCH, then the UE may continue operating in the NB, saving power. If there is an associated PDSCH, the BW may be widened to receive the PDSCH. Opening the BW requires some time, which may prove difficult in a single slot. However, with cross-slot scheduling, the UE may open up the BW in the slot in which PDSCH is to be decoded and which is subsequent to the slot in which the PDCCH was decoded.

PDCCH Indication

As previously mentioned, in case there is no PDCCH scheduled for an LTE UE, the UE may make numerous blind decoding attempts that are unnecessary. The number of decoding attempts made for PDCCH candidates (e.g. up to 44) and the corresponding computational overhead may change depending on the communication levels/channel conditions and existence (or availability) of PDCCH. If a PDCCH intended for a UE is transmitted, then the UE may perform blind decoding on the available candidate PDCCHs one candidate PDCCH at a time until the PDCCH associated with (intended for or corresponding to) the UE is detected. Consequently, if no PDCCH for that UE is transmitted, the UE makes a specified number (e.g. maximum number) of possible blind decoding attempts because it does not recognize whether a PDCCH intended for the UE has been transmitted, and those blind decoding attempts performed by the UE are considered unnecessary.

Therefore, in NR communications, one goal is to reduce unnecessary blind decoding attempts. In some embodiments, unnecessary blind decoding attempts for a UE may be avoided by introducing a certain type of signal from a base station (e.g. from a gNB) to the UE indicating the presence of PDCCH scheduled for the UE in the slot, e.g. the presence of a PDCCH intended for the UE in the slot. Thus, if a UE recognizes that an indicator associated with (or corresponding to, or intended for) the UE signals to the UE that a PDCCH for the UE is present in the slot, then the UE may perform blind decoding to detect any PDCCH among the different PDCCH candidates in (or during) the slot. If the UE finds that the indicator in fact signals the absence of a PDCCH for the UE, then the UE may stop decoding and/or enter a sleep state until the next slot, when the UE may be scheduled again. Using this approach, the UE may avoid making unnecessary PDCCH decoding attempts and save energy.

The indication (or indicator) may be transmitted by the base station per-UE or per-group. If the indication (indicator) is transmitted per-UE, then each UE in a cell may receive one indicator which signals the presence of a PDCCH (or lack thereof) for the UE. All the non-scheduled UEs (UEs for which no PDCCH is transmitted) which correctly decode the indication information (or indicator) may thereby avoid unnecessary blind decoding. If the indication (indicator) is transmitted per-group (where the group includes at least two UEs), then UEs in the group may perform blind decoding upon receiving an indication (indicator) that signals the presence of PDCCH for the group. Since such an indicator is a group indicator, there may be certain UEs in the group receiving the control information even though no PDCCH for those UEs was transmitted. If the indicator indicates (or signals) that there is no PDCCH for the group, then UEs in the group may stop decoding and/or enter a sleep state for the remaining duration of the slot.

Accordingly, in some embodiments, UEs which communicate with the network may be arranged into groups, e.g. by a base station (such as a gNB), where each group may include one or more UEs. In each slot, control indicator information may be transmitted to each group (e.g. by the gNB), with the control indicator information indicating the presence of PDCCH (or absence thereof) in the associated slot for any of UEs in the given group. If a UE determines that the indicator for its group indicates the presence of PDCCH, then the UE may perform blind decoding attempts in the associated slot. If a given (or respective) UE identifies a PDCCH intended for the given UE, then the given UE may decode the corresponding or associated PDSCH (the PDSCH associated with or corresponding to the decoded PDCCH). If the UE determines that the indicator for its group indicates the absence of PDCCH in the associated slot, then the UE may skip the blind decoding in the associated slot.

Carrying (Transmitting) Control Indicator Information

Multiple options for physical channel structure carrying the control indicator information during transmissions are possible and are contemplated. In some embodiments, the control indicator information (bits) may be added in one or more preexisting (other) channels to information already included in those other channels. For example, "group common PDCCH" (GCP) is a separate channel transmitted on preconfigured time frequency resources. The GCP carries slot format indicator information, and because it is decoded by all UEs prior to the UEs decoding other channels, it may be practical to include the control indicators in this channel.

In some embodiments, a separate channel may be designated for carrying control indicator information. For example, a PDCCH-like channel structure may be used, which may be monitored by all the UEs. In some embodiments, an altogether new channel may be designed and transmitted over narrowband (NB). The newly designed channel may be transmitted either in the same slot as the PDCCH, or in a different slot. In case the new channel is transmitted over NB, in a slot other than (or separate from) the slot in which PDCCH is transmitted, then the UE may receive a narrowband signal in a separate slot and determine whether to continue receiving a PDCCH in the next slot. This may not only allow the UE to avoid unnecessary blind decoding but may also allow the UE to save power by minimizing the monitoring BW utilized by the UE. In some embodiments, the UE may have separate stand-alone circuitry dedicated to monitoring the NB to further save power.

Control Indicator Information Transmission Options

Figure 8:
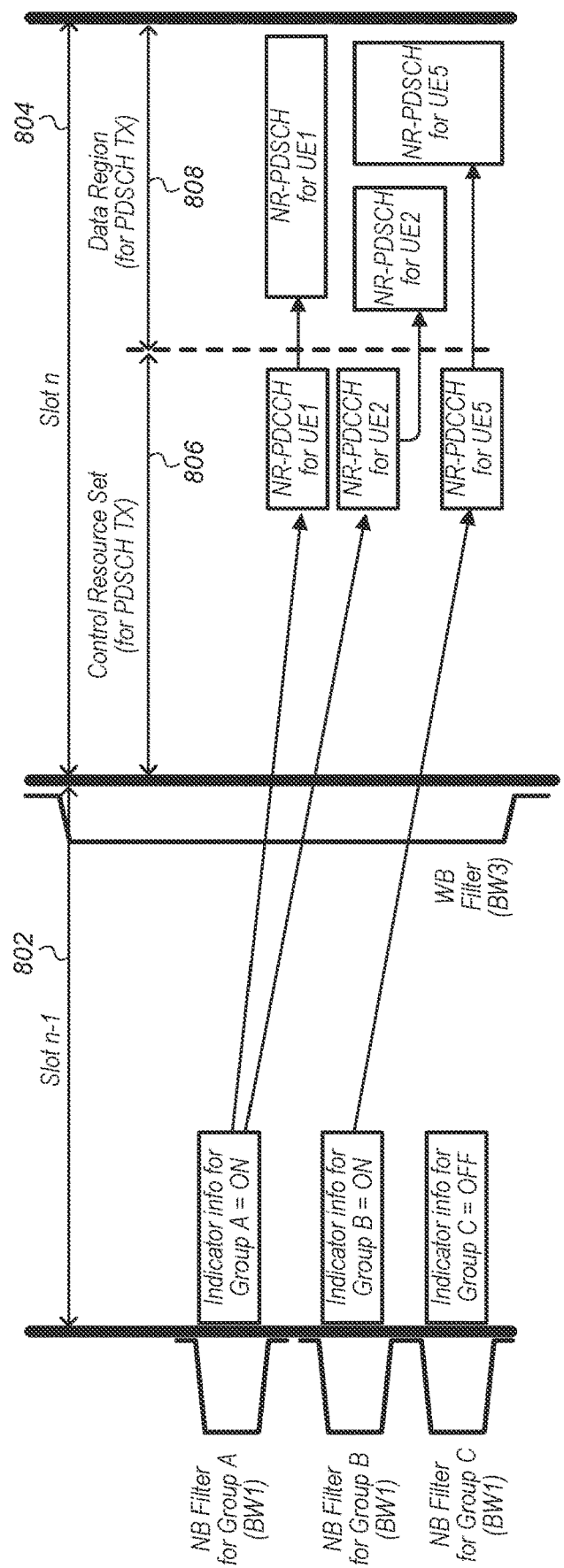
FIG. 8 shows an exemplary timing diagram illustrating transmission of control indicator information in same-slot scheduling, with the control indicator information and physical control channel transmitted in different slots, according to some embodiments.
Figure 9:
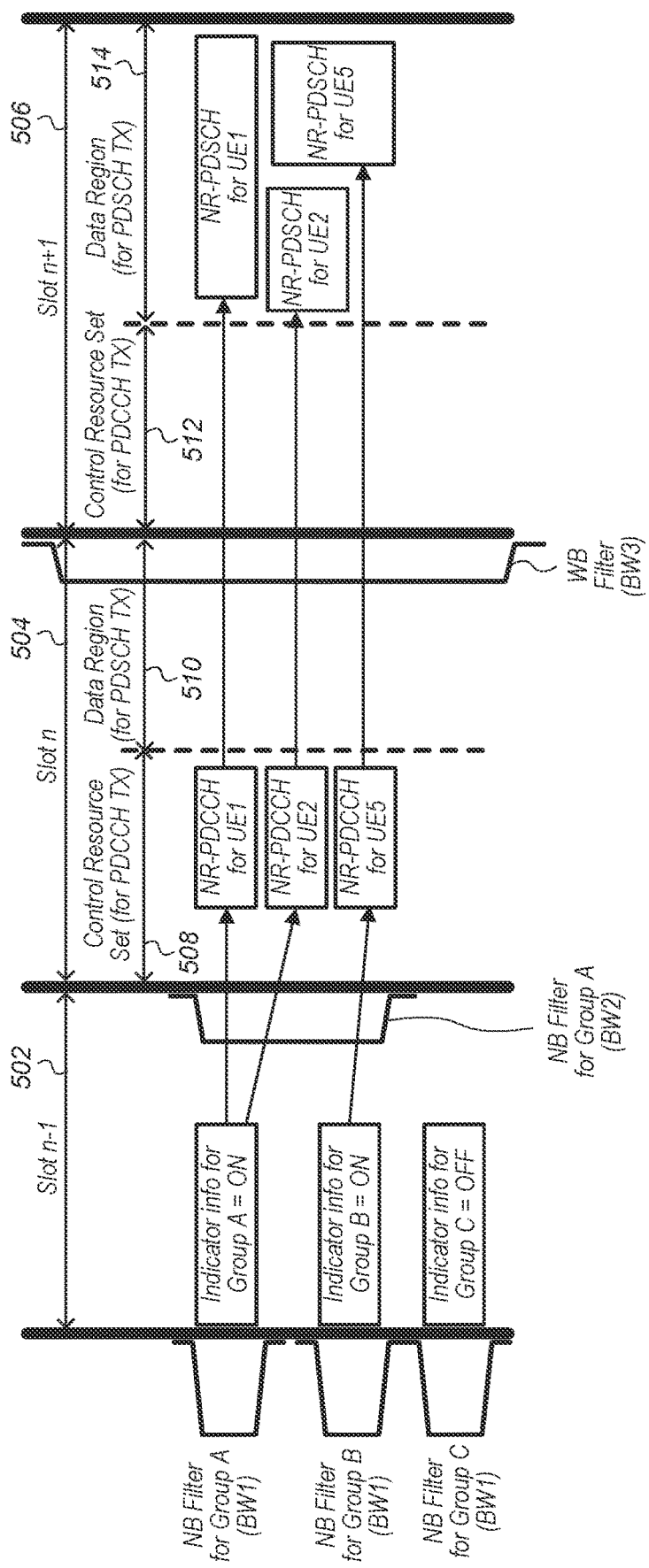
FIG. 9 shows an exemplary timing diagram illustrating transmission of control indicator information in cross-slot scheduling, with the control indicator information and physical control channel transmitted in different slots, according to some embodiments.

In some embodiments, at least four different transmission schemes or options may be defined and used for transmitting the control indicator information. The transmission schemes, or options may be based on the timing of the control indicator information and physical control channel (e.g. NR-PDCCH) with respect to each other, and the timing of the physical control channel (e.g. NR-PDCCH) and the physical data channel (e.g. NR-PDSCH) with respect to each other. Accordingly, four transmission options may be defined:

- Option 1: the control indicator information and the physical control channel are transmitted in the same slot, and the physical control channel and the physical data channel are transmitted according to same-slot scheduling (e.g. per FIG. 6)
- Option 2: the control indicator information and the physical control channel are transmitted in the same slot, and the physical control channel and the physical data channel are transmitted according to cross-slot scheduling (e.g. per FIG. 7)
- Option 3: the control indicator information and the physical control channel are transmitted in different slots, and the physical control channel and the physical data channel are transmitted according to same-slot scheduling (e.g. per FIG. 8)
- Option 4: the control indicator information and the physical control channel are transmitted in different slots, and the physical control channel and the physical data channel are transmitted according to cross-slot scheduling (e.g. per FIG. 9).

Option 1

Figure 6:
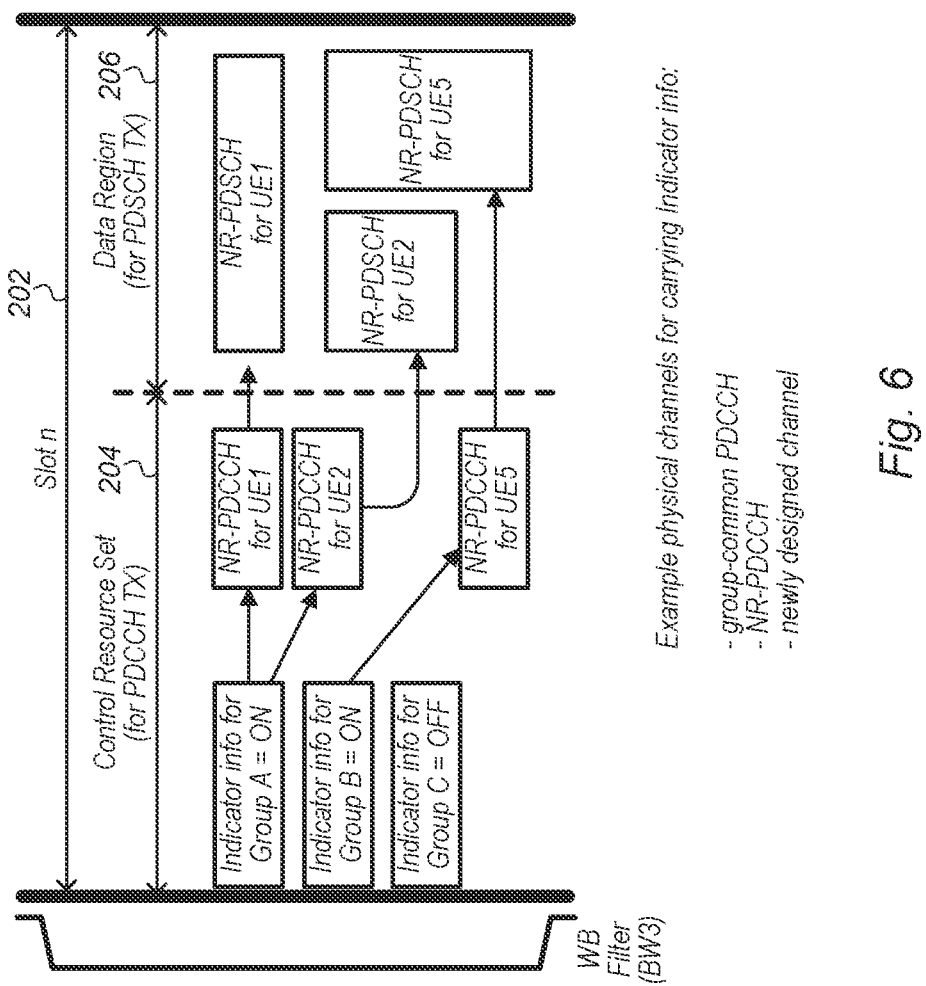
FIG. 6 shows an exemplary timing diagram illustrating transmission of control indicator information in same-slot scheduling, with the control indicator information and physical control channel transmitted in the same slot, according to some embodiments.

FIG. 6 shows an exemplary timing diagram illustrating transmission of the control indicator information in same-slot scheduling, with the control indicator information and physical control channel transmitted in the same slot, according to some embodiments. As seen in FIG. 6, by way of example, the UEs have been arranged into three groups. To put it another way, in the exemplary embodiments represented in FIG. 6, the network may presently include three groups of UEs. Group A={UE1, UE2}, Group B={UE5}, and Group C={UE10}. As shown in FIG. 6, the data for UE1, UE2 and UE5 are scheduled (e.g. by the network or base station) in slot n (202). The corresponding PDCCH for UE1, UE2, and UE5 are transmitted in the control resource set (portion 204) of the slot 202. The control indicator information for groups A, B, and C is set to ON, ON, and OFF respectively. In other words, the control indicator information for groups A and B indicates that PDCCH for the group is present, while the control indicator information for group C indicates that PDCCH for the group is absent. UE1 and UE2 detect that the respective indicator for (or corresponding to) group A, of which UE1 and UE2 are a part, is ON, and similarly, UE5 also detects that the respective indicator for (or corresponding to) group B, of which UE5 is a part, is ON. Accordingly, UE1, UE2, and UE5 all perform blind decoding to receive their respective PDCCHs. On the other hand, UE10 detects that the indicator for (or corresponding to) group C, of which UE10 is a part, is OFF, and thereby avoids unnecessary blind decoding. UE10 may enter sleep mode until the next slot when UE10 could be potentially be scheduled again. As also shown in FIG. 6, all the UEs use a wideband filter in every slot. Furthermore, as also illustrated in FIG. 6, subsequent to having performed blind decoding and receiving their respective PDCCHs, UE1, UE2, and UE5 may then decode their corresponding (associated) PDSCHs in the data region (portion 206) of the slot 202. As also indicated in FIG. 6, example physical channels that may carry the indicator information may include group-common PDCCH, NR-PDCCH, and/or a newly designated channel specifically for carrying the indicator (information). The example physical channels equally apply to the scenarios illustrated in FIGS. 7-9, which are described in further detail below.

Option 2

Figure 7:
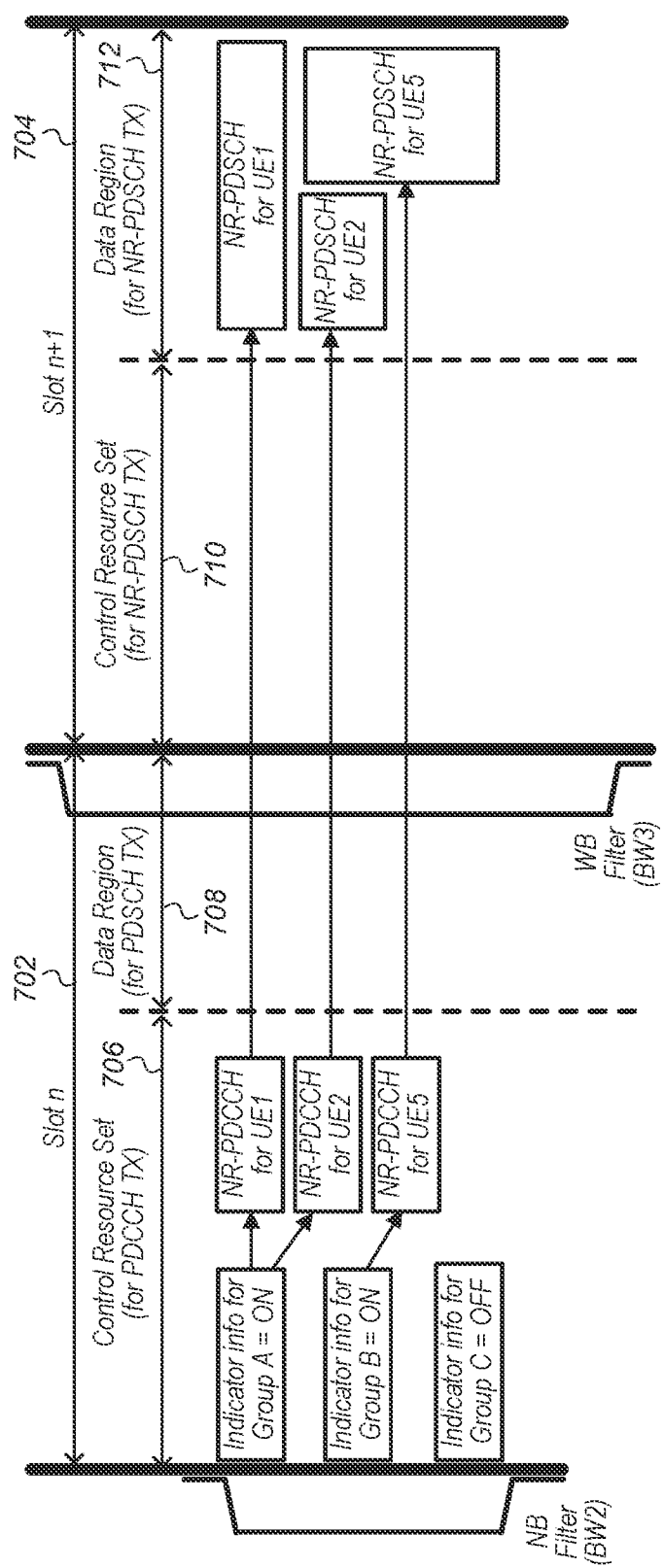
FIG. 7 shows an exemplary timing diagram illustrating transmission of control indicator information in cross-slot scheduling, with the control indicator information and physical control channel transmitted in the same slot, according to some embodiments.

FIG. 7 shows an exemplary timing diagram illustrating transmission of the control indicator information in cross-slot scheduling, with the control indicator information and physical control channel transmitted in the same slot 702, according to some embodiments. Since the control and data channels are transmitted according to (or in) cross-slot scheduling, the data region (portion 708) of slot 702 contains no transmission(s) corresponding to the illustrated control channels. As seen in FIG. 7, by way of example, the UEs have again been arranged into three groups. That is, the network may again include three groups of UEs. Group A={UE1, UE2}, Group B={UE5}, and Group C={UE10}. PDCCH for UE1, UE2 and UE5 is transmitted (e.g. by the network or base station) in slot n (702) in the control resource set (portion 706) of the slot 702 using narrowband BW2. Accordingly, the control indicator information for groups A, B, and C are set to ON, ON, and OFF, respectively, in slot n (702). In other words, the control indicator information for groups A and B indicates that PDCCH for the group is present, while the control indicator information for group C indicates that PDCCH for the group is absent. The corresponding PDSCHs for UE1, UE2, and UE5 are transmitted in slot n+K 704 (where K=1, 2, 3, etc). Again, UE1 and UE2 detect that the respective indicator for (or corresponding to) group A, of which UE1 and UE2 are a part, is ON, and similarly, UE5 also detects that the respective indicator for (or corresponding to) group B, of which UE5 is a part, is ON. Thus, UE1, UE2, and UE5 all perform blind decoding to receive their respective PDCCH. On the other hand, UE10 detects that the indicator for (or corresponding to) group C, of which UE10 is a part, is OFF, and thereby avoids unnecessary blind decoding. UE10 may again enter sleep mode until the next slot when UE10 could be potentially be scheduled again. In addition, UE10 saves additional power by receiving the signal carrying the control indicator information in a narrow bandwidth (BW2). Furthermore, as also illustrated in FIG. 7, subsequent to having performed blind decoding and receiving their respective PDCCHs, UE1, UE2, and UE5 may then decode their corresponding (associated) PDSCHs in the data region (portion 712) of the next slot 704. As shown in FIG. 7, no transmission(s) take place in the control resource set (portion 710) of slot 704.

Option 3

FIG. 8 shows an exemplary timing diagram illustrating transmission of the control indicator information in same-slot scheduling, with the control indicator information and physical control channel transmitted in different slots, according to some embodiments. As seen in FIG. 8, by way of example, the UEs have again been arranged into three groups. That is, the network may again include three groups of UEs. Group A={UE1, UE2}, Group B={UE5}, and Group C={UE10}. The data for UE1, UE2 and UE5 are scheduled (e.g. by the network or base station) in slot n 804, more specifically in the data region (portion 808) of slot n 804. The corresponding PDCCH for UE1, UE2, and UE5 are transmitted in the control resource set (portion 806) of slot n 804. However, the control indicator information is transmitted in slot n−1 802, that is, in a slot (802) other than (or separate) from the slot (804) in which the PDCCHs are transmitted. Thus, the control indicator information for groups A, B, and C (set to ON, ON, and OFF respectively) are transmitted through narrowband (of bandwidth BW1). In some embodiments, the control indicator information may be a form of sequence for energy detection or control information with a demodulation reference signal (DMRS)

in a small number of subcarriers. Each UE may be aware of the exact narrow band location of bandwidth BW1 where its control indicator is transmitted. Each UE may filter out its narrowband of bandwidth BW1 using a respective narrowband filter, and may thus receive its corresponding group's control indicator information.

Again, UE1 and UE2 detect that the respective indicator for (or corresponding to) group A, of which UE1 and UE2 are a part, is ON, and similarly, UE5 also detects that the respective indicator for (or corresponding to) group B, of which UE5 is a part, is ON. That is, U1, U2, and U5 detect that the control indicator information for their respective groups indicates that PDCCH for the group is present. Accordingly, UE1, UE2, and UE5 all perform blind decoding to receive their respective PDCCH. On the other hand, UE10 detects that the indicator for (or corresponding to) group C, of which UE10 is a part, is OFF. That is, U10 detects that the control indicator information for its respective group indicates that PDCCH for the group is absent, and thereby avoids unnecessary blind decoding. UE10 may therefore enter sleep mode until the next slot when UE10 could be potentially be scheduled again. As seen in FIG. 8, BW1 is less than or equal to BW3. Therefore, UE10 may save additional power by receiving a signal within a narrower band (of bandwidth BW1 narrower than BW2 shown for Option 2 in FIG. 7) in addition to avoiding unnecessary blind decoding.

Option 4

FIG. 9 shows an exemplary timing diagram illustrating transmission of the control indicator information in cross-slot scheduling, with the control indicator information and physical control channel transmitted in different slots, according to some embodiments. Since the control and data channels are transmitted according to (or in) cross-slot scheduling, the data region (portion 510) of slot 504 contains no transmission(s) corresponding to the illustrated control channels. As seen in FIG. 8, by way of example, the UEs have again been arranged into three groups. That is, the network may again include three groups of UEs. Group A={UE1, UE2}, Group B={UE5}, and Group C={UE10}. The PDCCH for UE1, UE2, and UE5 are transmitted in the control resource set (portion 508) of slot n 504. The control indicator information is transmitted in slot n-L 502 (where L=1, 2, 3, etc.), that is, in a slot (502) other than (or separate from) the slot (504) in which the PDCCHs are transmitted, and also different from the slot (506) in which the corresponding PDSCHs (or data) are transmitted. As shown, the corresponding PDSCHs for UE1, UE2, and UE5 are transmitted in slot n+K 506 (where K=1, 2, 3, etc.).

The control indicator information for groups A, B, and C are set to ON, ON, and OFF respectively. That is, the control indicator information for groups A and B indicates that PDCCH for the group is present, while the control indicator information for group C indicates that PDCCH for the group is absent. Again, UE1 and UE2 detect that the respective indicator for (or corresponding to) group A, of which UE1 and UE2 are a part, is ON, and similarly, UE5 also detects that the respective indicator for (or corresponding to) group B, of which UE5 is a part, is ON. Accordingly, UE1, UE2, and UE5 all perform blind decoding to receive their respective PDCCH. On the other hand, UE10 detects that the indicator for (or corresponding to) group C, of which UE10 is a part, is OFF, and thereby avoids unnecessary blind decoding.

During slot n-L 502, each UE may receive a signal of a narrower bandwidth (BW1) to receive the control indicator information. During slot n 504, each UE may receive a signal of a narrowband (BW2) to receive PDCCH. During slot n+K (specifically in/during data region portion 514), each UE may receive a signal of full bandwidth (BW3) to receive PDSCH. As indicated in FIG. 9, BW1<=BW2<=BW3. Thus, UE10, which does not have any PDCCH/PDSCH scheduled, may minimize power consumption by avoiding unnecessary blind decoding while also operating in the narrower bandwidth (of bandwidth BW1). As shown in FIG. 9, no transmission(s) take place in the control resource set (portion 512) of slot 506.

It should also be noted that the method and options described above may be applicable to UEs operating in IDLE mode, and UEs operating in Connected DRX mode. While FIGS. 6 to 9 show control indicators transmitted inside the bandwidth where the UE may potentially receive data, the method and options described above may also be applicable to cases where the bandwidth used for potential control indicator transmission does not overlap with the bandwidth used for potential data transmission.

Wireless Communication Device Performing Blind Decoding

Figure 10:
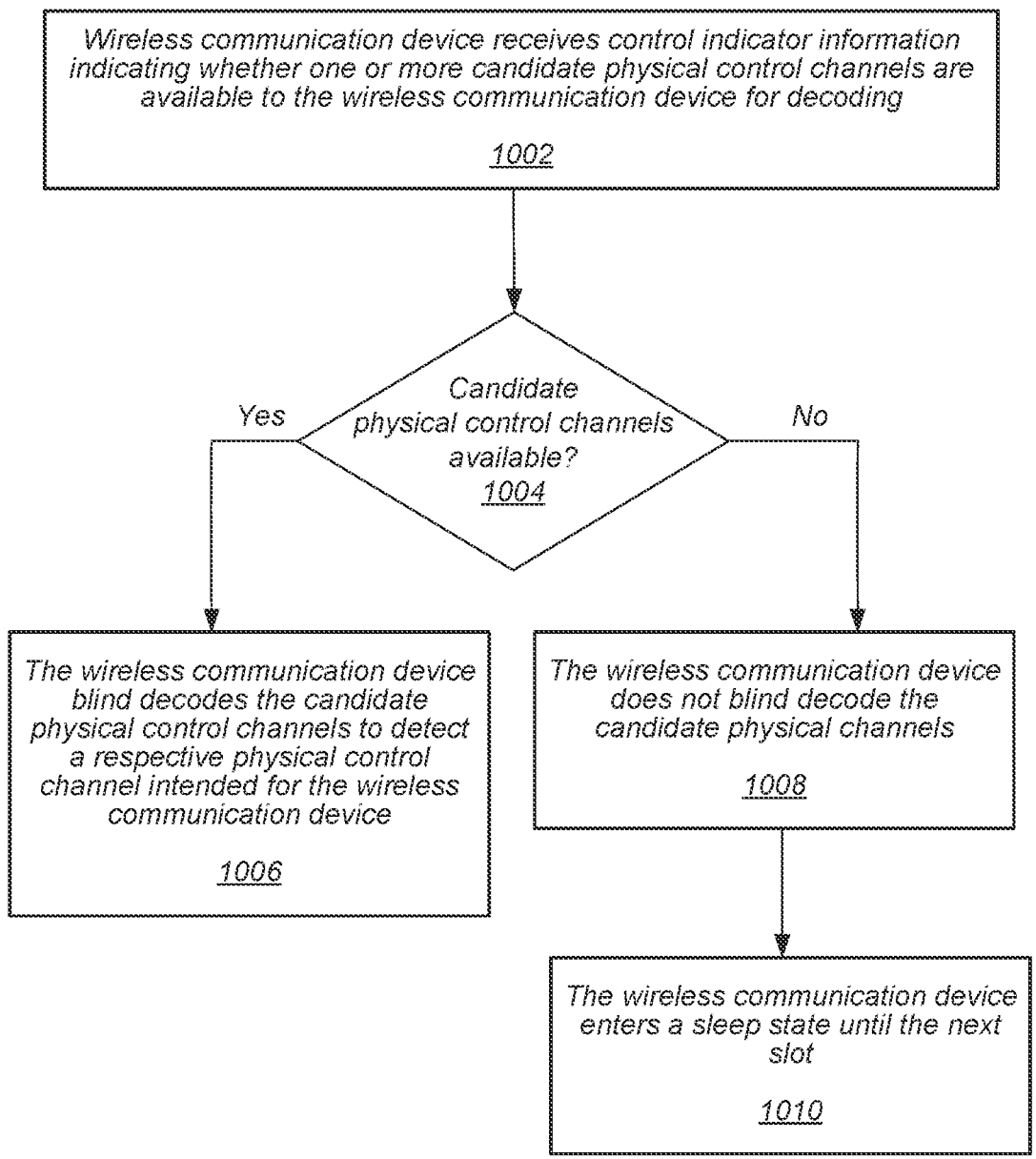
FIG. 10 shows a flow diagram illustrating a method for a wireless communication device to perform blind decoding of physical control channels, according to some embodiments.

Pursuant to the above, FIG. 10 shows a flow diagram illustrating a method for a wireless communication device to perform blind decoding of physical control channels, according to some embodiments. A wireless communication device conducting wireless communications according to any of various wireless communication standards, e.g. according to NR cellular standards, may receive control indicator information, e.g. from a base station, indicating whether one or more candidate physical control channels are available to the wireless communication device for decoding (1002). If the received control indicator indicates that one or more candidate physical control channels are available ("Yes" branch taken at 1004), the wireless communication device may blind decode the candidate physical control channels to detect and receive a respective physical control channel intended for the wireless communication device (1006). If the received control indicator indicates that no candidate physical control channels are available ("No" branch taken at 1004), the wireless communication device does not perform blind decoding on the candidate physical control channels (1008), and may enter a sleep state until the next slot where the wireless communication device may be scheduled again (1010).

Embodiments of the present invention may be realized in any of various forms. For example, in some embodiments, the present invention may be realized as a computer-implemented method, a computer-readable memory medium, or a computer system. In other embodiments, the present invention may be realized using one or more custom-designed hardware devices such as ASICs. In other embodiments, the present invention may be realized using one or more programmable hardware elements such as FPGAs.

In some embodiments, a non-transitory computer-readable memory medium (e.g., a non-transitory memory element) may be configured so that it stores program instructions and/or data, where the program instructions, if executed by a computer system, cause the computer system to perform a method, e.g., any of a method embodiments described herein, or, any combination of the method embodiments described herein, or, any subset of any of the method embodiments described herein, or, any combination of such subsets.

In some embodiments, a device (e.g., a UE) may be configured to include a processor (or a set of processors) and a memory medium (or memory element), where the memory medium stores program instructions, where the processor is configured to read and execute the program instructions from the memory medium, where the program instructions are executable to implement any of the various method embodiments described herein (or, any combination of the method embodiments described herein, or, any subset of any of the method embodiments described herein, or, any combination of such subsets). The device may be realized in any of various forms.

Although the embodiments above have been described in considerable detail, numerous variations and modifications will become apparent to those skilled in the art once the above disclosure is fully appreciated. It is intended that the following claims be interpreted to embrace all such variations and modifications.

The invention claimed is:

1. An apparatus comprising:
a processor configured to enable a wireless device to:
receive, in a first slot, control indicator information indicating whether or not the wireless device is to perform blind decoding of one or more candidate physical control channels within a specified number of subsequent slots beginning at a designated slot after the first slot;
perform the blind decoding of the one or more candidate physical control channels within the specified number of subsequent slots if the control indicator information indicates the wireless device is to perform the blind decoding; and
do not perform the blind decoding of the one or more candidate physical control channels within the specified number of subsequent slots if the control indicator information indicates that the wireless device is not to perform the blind decoding.

2. The apparatus of claim 1, wherein the one or more candidate physical control channels include a respective physical control channel intended for the wireless device, and wherein the processor is configured to further enable the wireless device to:
decode the respective physical control channel when the control indicator information indicates the wireless device is to perform the blind decoding.

3. The apparatus of claim 2, wherein the processor is configured to further enable the wireless device to receive a respective physical data channel corresponding to the respective physical control channel, subsequent to decoding the respective physical control channel.

4. The apparatus of claim 3, wherein the processor is configured to further enable the wireless device to receive the respective physical data channel in one of:
a slot different from a given slot in which the respective physical data channel was decoded; or
the given slot.

5. The apparatus of claim 1, wherein the device is part of a specified group of devices, wherein the control indicator information is intended for all devices in the specified group.

6. The apparatus of claim 1, wherein the control indicator information is carried in one of:
a first channel that also includes other information; or
a second channel dedicated to carrying the control indicator information.

7. The apparatus of claim 6, wherein the second channel is transmitted over narrowband.

8. A wireless device comprising:
radio circuitry configured to facilitate wireless communications of the wireless device; and
a processor communicatively coupled to the radio circuitry and configured to interoperate with the radio circuitry to:
receive, in a first slot, control indicator information indicating whether or not the wireless device is to perform blind decoding of one or more candidate physical control channels within a specified number of subsequent slots beginning at a designated slot after the first slot;
perform the blind decoding of the one or more candidate physical control channels within the specified number of subsequent slots if the control indicator information indicates the wireless device is to perform the blind decoding; and
do not perform the blind decoding of the one or more candidate physical control channels within the specified number of subsequent slots if the control indicator information indicates that the wireless device is not to perform the blind decoding.

9. The wireless device of claim 8, wherein the one or more candidate physical control channels include a respective physical control channel intended for the wireless device, and wherein the processor is configured to further interoperate with the radio circuitry to:
decode the respective physical control channel when the control indicator information indicates the wireless device is to perform the blind decoding.

10. The wireless device of claim 9, wherein the processor is configured to further interoperate with the radio circuitry to receive a respective physical data channel corresponding to the respective physical control channel, subsequent to decoding the respective physical control channel.

11. The wireless device of claim 10, wherein the processor is configured to further interoperate with the radio circuitry to receive the respective physical data channel in one of:
a slot different from a given slot in which the respective physical data channel was decoded; or
the given slot.

12. The wireless device of claim 8, wherein the device is part of a specified group of devices, wherein the control indicator information is intended for all devices in the specified group.

13. The wireless device of claim 8, wherein the control indicator information is carried in one of:
a first channel that also includes other information; or
a second channel dedicated to carrying the control indicator information.

14. The wireless device of claim 13, wherein the second channel is transmitted over narrowband.

15. A non-transitory memory element storing instructions executable by a processor to enable a wireless device to:
receive, in a first slot, control indicator information indicating whether or not the wireless device is to perform blind decoding of one or more candidate physical control channels within a specified number of subsequent slots beginning at a designated slot after the first slot;
perform the blind decoding of the one or more candidate physical control channels within the specified number of subsequent slots if the control indicator information indicates the wireless device is to perform the blind decoding; and
do not perform the blind decoding of the one or more candidate physical control channels within the specified number of subsequent slots if the control indicator information indicates that the wireless device is not to perform the blind decoding.

16. The non-transitory memory element of claim 15, wherein the one or more candidate physical control channels include a respective physical control channel intended for the wireless device, and wherein the instructions are executable by the processor to further enable the wireless device to:
- decode the respective physical control channel when the control indicator information indicates the wireless device is to perform the blind decoding.

17. The non-transitory memory element of claim 15, wherein the instructions are executable by the processor to further enable the wireless device to receive a respective physical data channel corresponding to the respective physical control channel, subsequent to decoding the respective physical control channel.

18. The non-transitory memory element of claim 17, wherein the instructions are executable by the processor to further enable the wireless device to receive the respective physical data channel in one of:
- a slot different from a given slot in which the respective physical data channel was decoded; or
- the given slot.

19. The non-transitory memory element of claim 15, wherein the device is part of a specified group of devices, wherein the transmitted control indicator information is intended for all devices in the specified group.

20. The non-transitory memory element of claim 15, wherein the control indicator information is carried in one of:
- a first channel that also includes other information; or
- a narrowband channel dedicated to carrying the control indicator information.

\* \* \* \* \*